United States Patent
Wang et al.

(10) Patent No.: US 11,324,060 B2
(45) Date of Patent: May 3, 2022

(54) UL TRANSMISSION METHOD FOR ENDC DUAL CONNECTION DEVICE

(71) Applicant: QUALCOMM Incorporated, San Diego, CA (US)

(72) Inventors: Haojun Wang, Xian Shaanxi (CN); Kaikai Yang, Xian Shaanx (CN); Zhenqing Cui, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/896,069

(22) Filed: Jun. 8, 2020

(65) Prior Publication Data
US 2021/0051744 A1 Feb. 18, 2021

(30) Foreign Application Priority Data
Aug. 16, 2019 (WO) ............... PCT/CN2019/101119

(51) Int. Cl.
| | |
|---|---|
| H04W 76/15 | (2018.01) |
| H04W 80/02 | (2009.01) |
| H04W 52/36 | (2009.01) |
| H04W 28/02 | (2009.01) |
| H04W 80/08 | (2009.01) |

(52) U.S. Cl.
CPC ....... *H04W 76/15* (2018.02); *H04W 28/0278* (2013.01); *H04W 52/365* (2013.01); *H04W 80/02* (2013.01); *H04W 80/08* (2013.01)

(58) Field of Classification Search
None
See application file for complete search history.

(56) References Cited

U.S. PATENT DOCUMENTS

| | | | | |
|---|---|---|---|---|
| 2017/0111873 A1* | 4/2017 | Kakishima | .......... | H04W 52/346 |
| 2017/0289851 A1* | 10/2017 | Majmundar | .......... | H04W 28/08 |
| 2018/0139646 A1* | 5/2018 | Basu Mallick | ... | H04W 72/0413 |
| 2019/0069308 A1 | 2/2019 | Lee et al. | | |
| 2020/0221329 A1* | 7/2020 | Kim | .......... | H04W 72/0453 |
| 2020/0359330 A1* | 11/2020 | Zacharias | .......... | H04W 52/365 |
| 2021/0022206 A1* | 1/2021 | Kim | .......... | H04W 72/14 |
| 2021/0127297 A1* | 4/2021 | Wang | .......... | H04W 28/08 |
| 2021/0211988 A1* | 7/2021 | Jung | .......... | H04W 52/386 |

FOREIGN PATENT DOCUMENTS

| | | |
|---|---|---|
| CN | 109618419 A | 4/2019 |
| CN | 109644369 A | 4/2019 |
| WO | WO-2019066628 A1 | 4/2019 |
| WO | WO-2020191772 A1 * 10/2020 ............ H04W 28/08 |

OTHER PUBLICATIONS

International Search Report and Written Opinion—PCT/CN2019/101119—ISA/EPO—dated May 21, 2020.

* cited by examiner

*Primary Examiner* — Anh Vu H Ly
(74) *Attorney, Agent, or Firm* — Norton Rose Fulbright US LLP

(57) ABSTRACT

One or more aspects of uplink transmissions for dual connectivity connection devices are disclosed. In some implementations, a method of wireless communication includes adjusting, by a user equipment (UE) while in a dual connectivity configuration, a threshold. The method also includes routing, by the UE, data to one of multiple radio link control (RLC) layers based on the adjusted threshold. The method further includes transmitting, by the UE, the data.

30 Claims, 7 Drawing Sheets

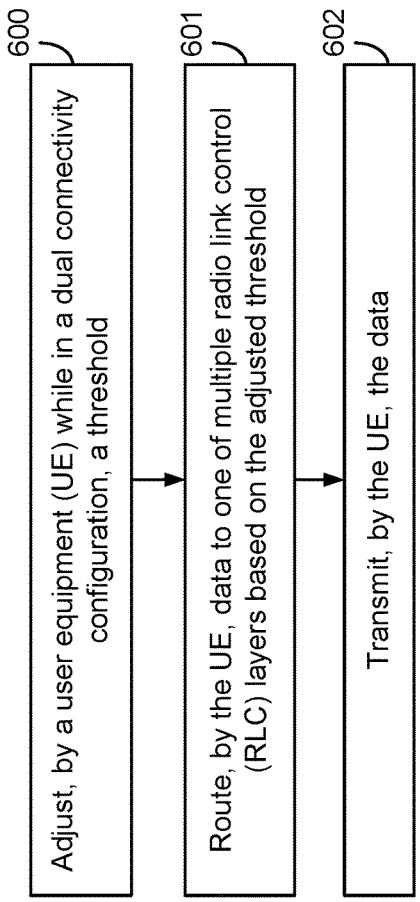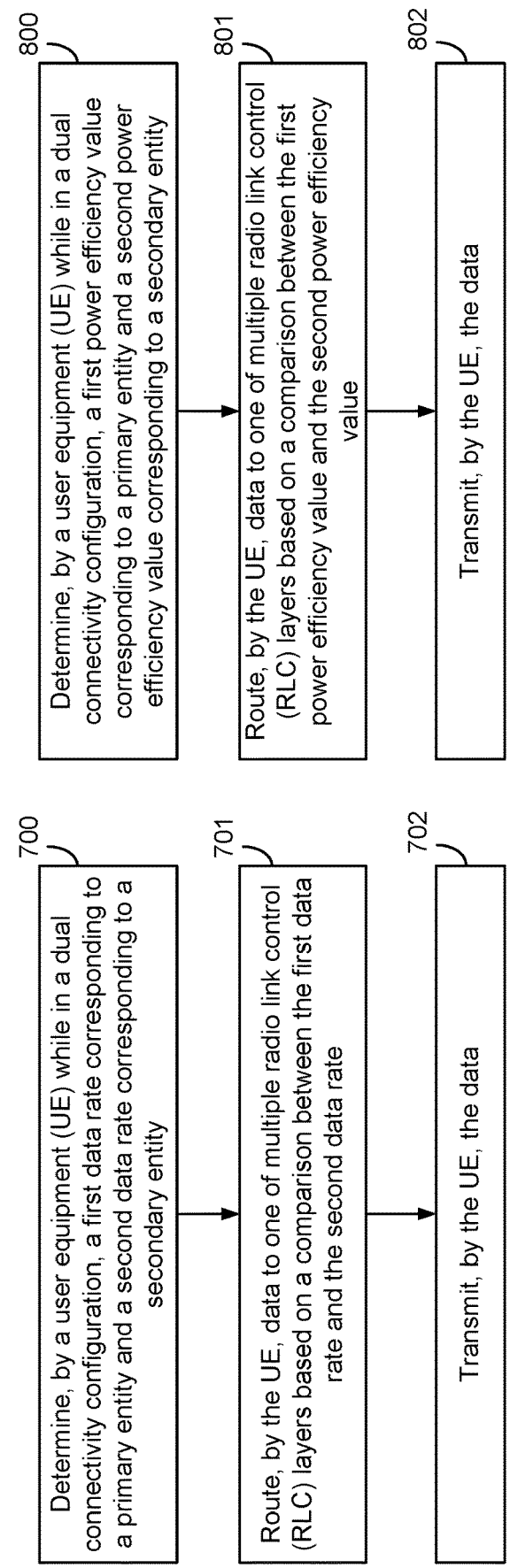

UL TRANSMISSION METHOD FOR ENDC DUAL CONNECTION DEVICE

CROSS-REFERENCE TO RELATED APPLICATIONS

This application claims the benefit of International Patent Application No. PCT/CN2019/101119, entitled, "UL TRANSMISSION METHOD FOR ENDC DUAL CONNECTION DEVICE" filed on Aug. 16, 2019, which is expressly incorporated by reference herein in its entirety.

BACKGROUND

Field

Aspects of the present disclosure relate generally to wireless communication systems, and more particularly, by way of example but not limitation, to uplink transmissions for dual connectivity connection devices.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks. As mobile communications technologies advance, new technologies are being studied. For example, 3GPP is developing a standard for a fifth generation (5G) mobile communications technology. 5G technology builds upon the techniques of fourth generation (4G) technology and long-term evolution (LTE) technology to further enhance mobile communications. 5G technology is a current research topic for a variety of companies, universities, and others.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the 5G technologies not only to meet the growing demand for mobile broadband access, but to advance and enhance the user experience with mobile communications.

For UEs configured for dual connectivity, when the UE submits a packet data convergence protocol (PDCP) packet data unit (PDU) to a lower layer, a primary radio link control (RLC) entity is preferred. However, the UE may submit the PDCP PDU to a secondary RLC entity based on a threshold, such as ul-DataSplitThreshold. For example, the UE may submit the PDCP PDU to the secondary RLC entity if a total amount of a PDCP data volume and a RLC data volume pending for initial transmission (as specified in TS 38.322 [5]) in two associated RLC entities is equal to or larger than the threshold (e.g., ul-DataSplitThreshold). Such an approach can have low efficiency, uses a single static, default threshold, and does not take into account operating conditions of the UE.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes adjusting, by a user equipment (UE) while in a dual connectivity configuration, a threshold. The method also includes routing, by the UE, data to one of multiple radio link control (RLC) layers based on the adjusted threshold. The method further includes transmitting, by the UE, the data.

In an additional aspect of the disclosure, an apparatus configured for wireless communication includes means for adjusting, by a UE while in a dual connectivity configuration, a threshold. The apparatus also includes means for routing, by the UE, data to one of multiple RLC layers based on the adjusted threshold. The apparatus further includes means for transmitting, by the UE, the data.

In an additional aspect of the disclosure, a non-transitory computer-readable medium having program code recorded thereon. The program code further includes code to: adjust, by a UE while in a dual connectivity configuration, a threshold; route, by the UE, data to one of multiple RLC layers based on the adjusted threshold; and initiate, by the UE, transmission of the data.

In an additional aspect of the disclosure, an apparatus configured for wireless communication is disclosed. The apparatus includes at least one processor, and a memory coupled to the processor. The memory stores instructions that, when executed by the at least one processor, cause the at least one processor to: adjust, by a UE while in a dual connectivity configuration, a threshold; route, by the UE, data to one of multiple RLC layers based on the adjusted threshold; and initiate, by the UE, transmission of the data.

In an additional aspect of the disclosure, an apparatus configured for wireless communication includes a processor system configured to: adjust, by a UE while in a dual connectivity configuration, a threshold; route, by the UE, data to one of multiple RLC layers based on the adjusted threshold; and initiate, by the UE, transmission of the data. The apparatus also includes an interface via which the data is provided for transmission.

In another aspect of the disclosure, a method of wireless communication includes determining, by a UE while in a dual connectivity configuration, a first power efficiency value corresponding to a primary entity and a second power efficiency value corresponding to a secondary entity. The method also includes routing, by the UE, the data to one of multiple RLC layers based on a comparison between the first power efficiency value and the second power efficiency value. The method further includes transmitting, by the UE, the data.

In an additional aspect of the disclosure, an apparatus configured for wireless communication includes means for determining, by a UE while in a dual connectivity configuration, a first power efficiency value corresponding to a primary entity and a second power efficiency value corresponding to a secondary entity. The apparatus also includes means for routing, by the UE, the data to one of multiple RLC layers based on a comparison between the first power efficiency value and the second power efficiency value. The apparatus further includes means for transmitting, by the UE, the data.

In an additional aspect of the disclosure, a non-transitory computer-readable medium having program code recorded thereon. The program code further includes code to: determine, by a UE while in a dual connectivity configuration, a first power efficiency value corresponding to a primary entity and a second power efficiency value corresponding to a secondary entity; route, by the UE, data to one of multiple RLC layers based on a comparison between the first power efficiency value and the second power efficiency value; and initiate, by the UE, transmission of the data.

In an additional aspect of the disclosure, an apparatus configured for wireless communication is disclosed. The apparatus includes at least one processor, and a memory coupled to the processor. The memory stores instructions that, when executed by the at least one processor, cause the at least one processor to: determine, by a UE while in a dual connectivity configuration, a first power efficiency value corresponding to a primary entity and a second power efficiency value corresponding to a secondary entity; route, by the UE, data to one of multiple RLC layers based on a comparison between the first power efficiency value and the second power efficiency value; and initiate, by the UE, transmission of the data.

In an additional aspect of the disclosure, an apparatus configured for wireless communication includes a processor system configured to: determine, by a UE while in a dual connectivity configuration, a first power efficiency value corresponding to a primary entity and a second power efficiency value corresponding to a secondary entity; route, by the UE, data to one of multiple RLC layers based on a comparison between the first power efficiency value and the second power efficiency value; and initiate, by the UE, transmission of the data. The apparatus also includes an interface via which the data is provided for transmission.

In another aspect of the disclosure, a method of wireless communication includes determining, by a UE while in a dual connectivity configuration, a first data rate corresponding to a primary entity and a second data rate corresponding to a secondary entity. The method also includes routing, by the UE, data to one of multiple RLC layers based on a comparison between the first data rate and the second data rate. The method further includes transmitting, by the UE, the data.

In an additional aspect of the disclosure, an apparatus configured for wireless communication includes means for determining, by a UE while in a dual connectivity configuration, a first data rate corresponding to a primary entity and a second data rate corresponding to a secondary entity. The apparatus also includes means for routing, by the UE, data to one of multiple RLC layers based on a comparison between the first data rate and the second data rate. The apparatus further includes means for transmitting, by the UE, the data.

In an additional aspect of the disclosure, a non-transitory computer-readable medium having program code recorded thereon. The program code further includes code to: determine, by a UE while in a dual connectivity configuration, a first data rate corresponding to a primary entity and a second data rate corresponding to a secondary entity; route, by the UE, data to one of multiple RLC layers based on a comparison between the first data rate and the second data rate; and initiate, by the UE, transmission of the data.

In an additional aspect of the disclosure, an apparatus configured for wireless communication is disclosed. The apparatus includes at least one processor, and a memory coupled to the processor. The memory stores instructions that, when executed by the at least one processor, cause the at least one processor to: determine, by a UE while in a dual connectivity configuration, a first data rate corresponding to a primary entity and a second data rate corresponding to a secondary entity; route, by the UE, data to one of multiple RLC layers based on a comparison between the first data rate and the second data rate; and initiate, by the UE, transmission of the data.

In an additional aspect of the disclosure, an apparatus configured for wireless communication includes a processor system configured to: determine, by a UE while in a dual connectivity configuration, a first data rate corresponding to a primary entity and a second data rate corresponding to a secondary entity; route, by the UE, data to one of multiple RLC layers based on a comparison between the first data rate and the second data rate; and initiate, by the UE, transmission of the data. The apparatus also includes an interface via which the data is provided for transmission.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 6 is a block diagram illustrating example blocks executed by a UE configured according to an aspect of the present disclosure.

FIG. 7 is a block diagram illustrating example blocks executed by a UE configured according to an aspect of the present disclosure.

FIG. 8 is a block diagram illustrating example blocks executed by a UE configured according to an aspect of the present disclosure.

DETAILED DESCRIPTION

Figure 1:
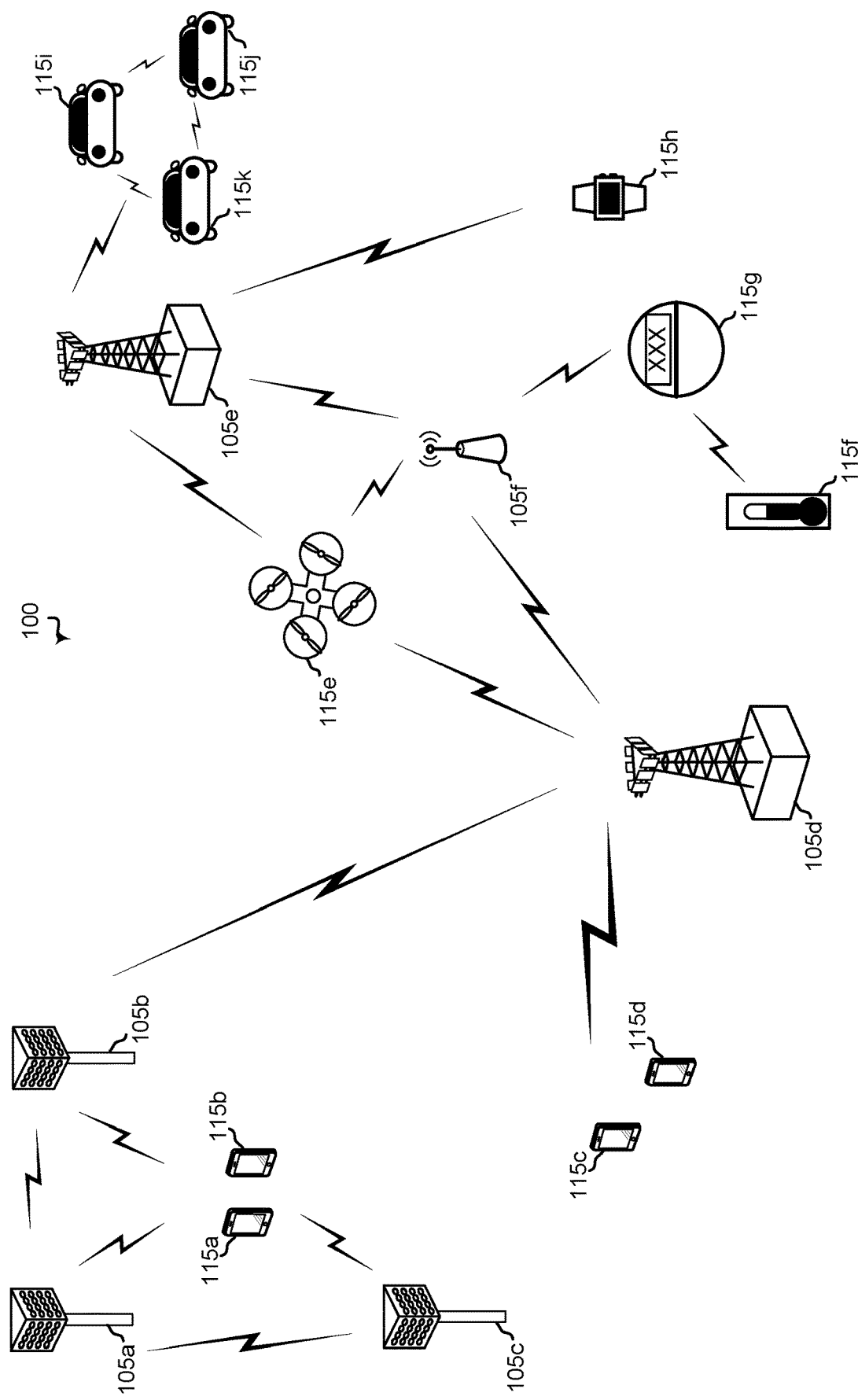
FIG. 1 is a block diagram illustrating details of a wireless communication system.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to an evolved universal terrestrial radio access (E-UTRA) new radio (NR) dual connectivity (ENDC) dual connection device configured to perform uplink (UL) transmission based on an adjusted threshold, such as uplink data split threshold. In particular, the systems, methods, devices, and apparatuses described herein enable improved performance, improved throughput, reduced latency, or a combination thereof, as compared to conventional approaches in which a default, static uplink data split threshold (e.g., ul-DataSplitThreshold) is used. To illustrate, in some wireless communications systems, a user equipment (UE) in a dual connectivity configuration, adjusts a threshold, such as a default, static uplink data split threshold—e.g., ul-DataSplitThreshold—to generate an adjusted threshold. The UE may route data to one of multiple radio link control (RLC) layers based on the adjusted threshold, and transmit the data. The multiple RLC layers may include a first layer corresponding to a primary RLC entity and a second RLC layer corresponding to a secondary entity. In some implementations, the UE may adjust the threshold based on a mode selection of multiple modes, such as multiple uplink transmission modes for a dual connection device. The dual connection device is configured for dual connectivity, such that the device may have an ENDC configuration. In some implementations, the multiple modes may include at least a turbo mode or a power mode, such as a low power mode or a power save mode.

Based on selection of the turbo mode, the UE may determine a first data rate corresponding to a primary entity and a second data rate corresponding to a secondary entity, and route the data to one of multiple RLC layers based on a comparison between the first data rate and the second data rate. For example, the UE may increase the threshold based on the first data rate being greater than the second data rate, may decrease the threshold based on the second data rate being greater than the first data rate, may maintain the threshold if the first and second data rates are equal, or a combination thereof.

Based on selection of the power mode, the UE may determine a first power efficiency value corresponding to a primary entity and a second power efficiency value corresponding to a secondary entity, and route the data to one of multiple RLC layers based on a comparison between the first power efficiency value and the second power efficiency value. For example, the UE may increase the threshold based on the first power efficiency value being greater than the second power efficiency value, may decrease the threshold based on the second power efficiency value being greater than the first power efficiency value, may maintain the threshold if the first and second power efficiency values are equal, or a combination thereof.

In implementations where the threshold is increase, the UE may determine a buffer status report (BSR) corresponding to a primary entity, a power headroom report (PHR) corresponding to the primary entity, or both. In such implementations, the UE may increase a BSR value of the BSR to generate a modified BSR, and transmit (to a primary network device) the modified BSR, the PHR, or both. Additionally, or alternatively, the UE may determine a BSR corresponding to a secondary entity, a PHR corresponding to the secondary entity, or both, and may decrease and transmit (to a secondary network device) a BSR value of the BSR corresponding to the secondary entity to generate a modified BSR corresponding to the secondary entity, a PHR value of the PHR corresponding to the secondary entity to generate a modified PHR corresponding to the secondary entity, or both.

In implementations where the threshold is decreased, the UE may determine a BSR corresponding to the secondary entity, a PHR corresponding to the secondary entity, or both. In some implementations, the UE may increase a BSR value of the BSR to generate a modified BSR, and transmit (to a secondary network device) the modified BSR, the PHR, or both. Additionally, or alternatively, the UE may determine a BSR corresponding to a primary entity, a PHR corresponding to the primary entity, or both, and may decrease and transmit (to a primary network device) a BSR value of the BSR corresponding to the primary entity to generate a modified BSR corresponding to the primary entity, a PHR value of the PHR corresponding to the primary entity to generate a modified PHR corresponding to the primary entity, or both.

Accordingly, the systems, methods, devices, and apparatuses described herein enable improved performance, improved throughput, reduced latency, or a combination thereof, as compared to a conventional approach in which a default, static uplink data split threshold (e.g., ul-DataSplit-Threshold) is used. For example, the turbo mode may improve performance by providing higher uplink throughput and/or low latency as compared to the conventional approach. As another example, the power mode (e.g., the low power mode or power saving mode) may improve efficiency by providing a lower energy cost per UL bit as compared to the conventional approach. Additionally, by selecting one of multiple modes and adjusting the threshold, such as a default threshold, the UE may advantageously take into account one or more operating conditions of the UE and thereby improve an operation (e.g., performance and/or efficiency) of the UE.

In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks/systems/devices), as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may include one or more GERANs, which may be coupled with UTRANs in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may include at least one element of a claim.

FIG. 1 shows wireless network 100 for communication according to some embodiments. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.). Wireless network 100 may include one or more UEs that modify a setting of a frequency oscillator at the UE and that communicate the setting to a base station via wireless network 100, as further described herein with reference to FIG. 3.

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may include a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may include examples of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT)

or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the embodiment illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access 5G network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. Backhaul communication between base stations of wireless network 100 may occur using wired and/or wireless communication links.

In operation at 5G network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of embodiments supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
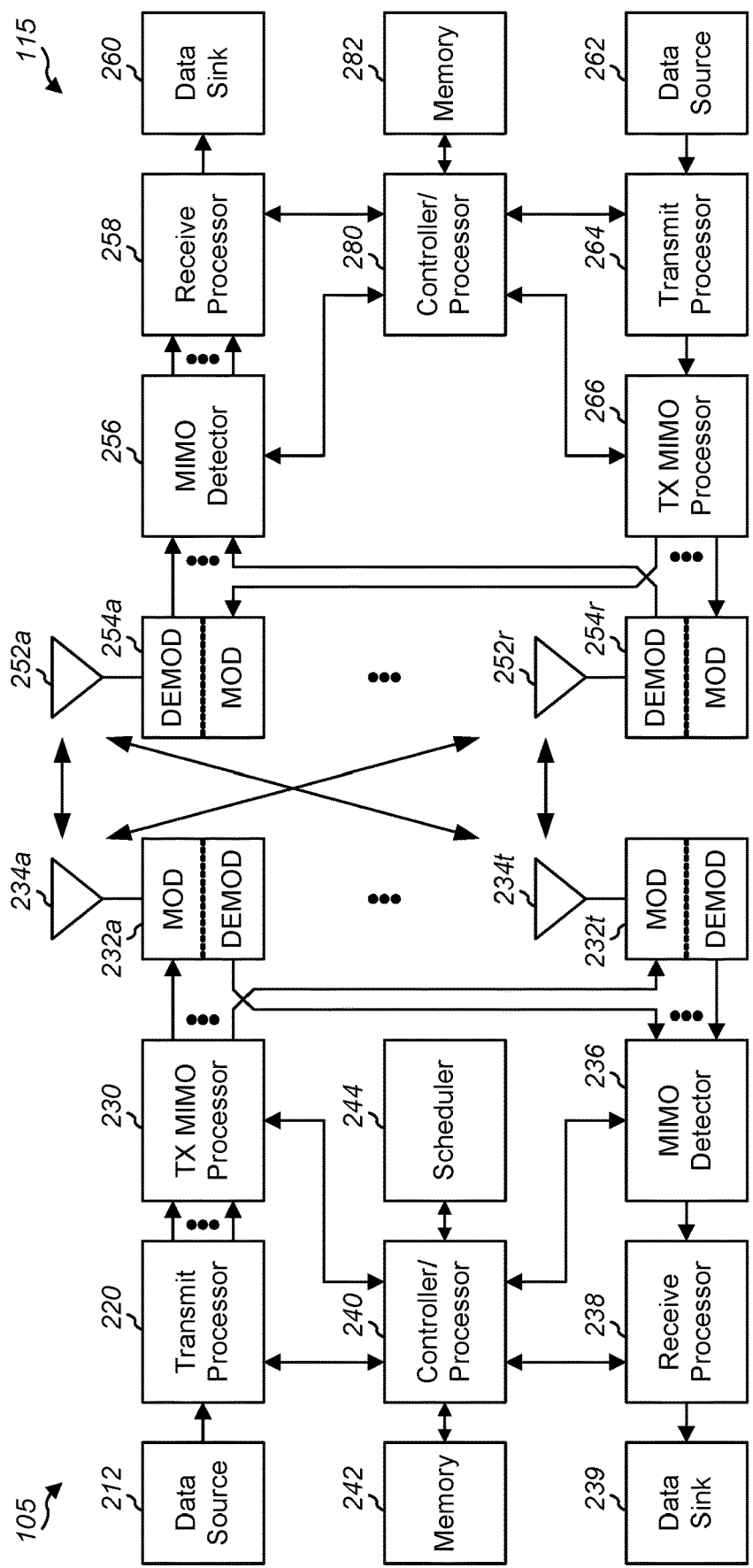
FIG. 2 is a block diagram conceptually illustrating a design of a base station and a user equipment (UE) configured according to one aspect of the present disclosure.

FIG. 2 shows a block diagram of a design of a base station 105 and a UE 115, which may be any of the base stations and one of the UEs in FIG. 1. FIG. 2 illustrates components used to communicate signals between base station 105 and UE 115. Such signals may include data routed to one of multiple RLC layers and communicated from UE 115 to base station 105, as further described with reference to FIG. 3. For a data split scenario using a data split threshold, UE may route the data to the one of the multiple RLC layers based on a selected mode of multiple modes, the multiple modes including a turbo mode, a power save mode, or both. As shown in FIG. 2, base station 105 may be equipped with antennas 234a through 234t, and UE 115 may be equipped with antennas 252a through 252r for facilitating wireless communications.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal. The symbols from the transmit processor 264 may be precoded by TX MIMO processor 266 if applicable, further processed by the modulators 254a through 254r (e.g., for SC-FDM, etc.), and transmitted to the base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 6-8, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, or a 25-µs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
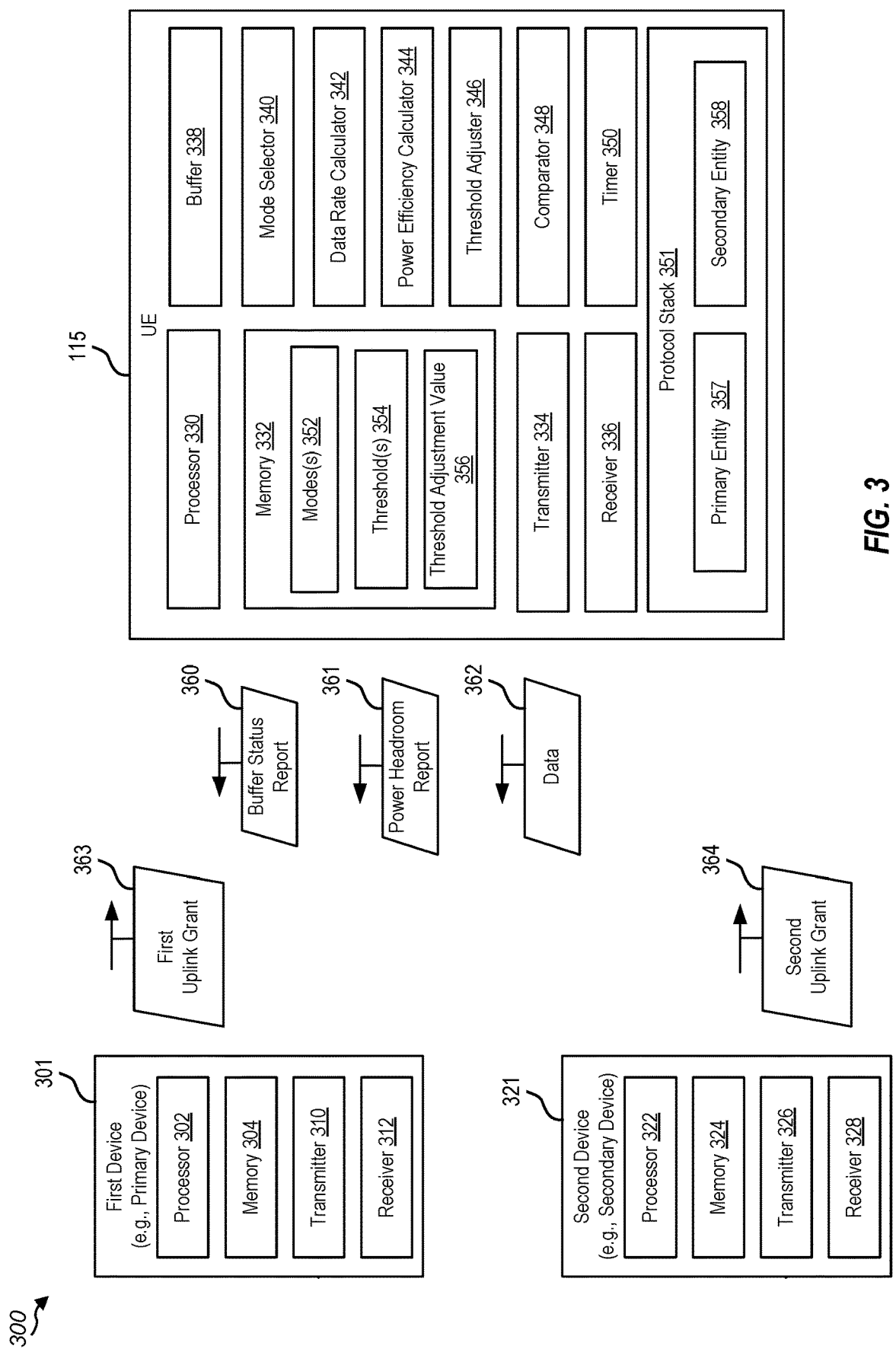
FIG. 3 is a block diagram illustrating an example of a wireless communications system for UL transmissions for an evolved universal terrestrial radio access (E-UTRA) new radio (NR) dual connectivity (ENDC) dual connection device.

Referring to FIG. 3, an example of a wireless communications system 300 for UL transmissions for an ENDC dual connection device in accordance with aspects of the present disclosure is shown. In some examples, wireless communications system 300 may implement aspects of wireless communication system 100. As shown, wireless communication system 300 includes first device 301, second device 321, and UE 115. First device 301, second device 321, or both may include or correspond to base station 105. In some implementations, each of first device 301 and second device 321 may include a different RLC entity. Additionally, or alternatively, first device 301 and second device 321 may belong to the same cell group or to different cell groups.

First device 301 may include or correspond to a primary entity, such as a primary node. In some implementations, first device 301 includes an eNB, such as a master node. Alternatively, in other implementations, first device 301 includes a gNB (e.g., NR) and may be designated as a primary node. Second device 321 may include or correspond to a secondary entity, such as a secondary node. In some implementations, second device 321 includes a gNB, such as a secondary node. Alternatively, in other implementations, second device 321 includes an eNB (e.g., LTE) and may be designated as a secondary node. Although shown as first device 301 and second device 321 being separate, in other implementations, first device 301 and second device 321 may be included in the say device, such as the same base station 105. Additionally, or alternatively, in some implementations, first device 301 and second device 321 may be coupled to an evolved packet core (EPC)/5G core (5GC), as described further herein, at least with reference to FIG. 4.

First device 301 includes processor 302, memory 304, transmitter 310, and receiver 312. Processor 302 may be configured to execute instructions stores at memory 304 to perform the operations described herein. In some implementations, processor 302 includes or corresponds to controller/processor 240, and memory 304 includes or corresponds to memory 242.

Transmitter 310 is configured to transmit data to one or more other devices, and receiver 312 is configured to receive data from one or more other devices. For example, transmitter 310 may transmit data, and receiver 312 may receive data, via a network, such as a wired network, a wireless network, or a combination thereof. For example, first device 301 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 310 and receiver 312 may be replaced with a transceiver. Additionally, or alternatively, transmitter 310, receiver, 312, or both may include or correspond to one or more components of base station 105 described with reference to FIG. 2.

Second device 321 includes processor 322, memory 324, transmitter 326, and receiver 328. Processor 322 may be configured to execute instructions stores at memory 324 to perform the operations described herein. In some implementations, processor 322 includes or corresponds to controller/processor 240, and memory 324 includes or corresponds to memory 242.

Transmitter 326 is configured to transmit data to one or more other devices, and receiver 328 is configured to receive data from one or more other devices. For example, transmitter 326 may transmit data, and receiver 328 may receive data, via a network, such as a wired network, a wireless network, or a combination thereof. For example, second device 321 may be configured to transmit and/or receive data via a direct device-to-device connection, a LAN, a WAN, a modem-to-modem connection, the Internet, intranet, extranet, cable transmission system, cellular communication network, any combination of the above, or any other communications network now known or later developed within which permits two or more electronic devices to communicate. In some implementations, transmitter 326 and receiver 328 may be replaced with a transceiver. Additionally, or alternatively, transmitter 326, receiver, 328, or both may include or correspond to one or more components of base station 105 described with reference to FIG. 2.

UE 115 may be configured to communicate with first device 301 and second device 321. UE 115 may be configured to communicate with first device 301 via a first path, such as a first communication path, and with second device 321 via a second path, such as a second communication path.

UE 115 includes processor 330, memory 332, transmitter 334, receiver 336, a buffer 338, a mode selector 340, a data rate calculator 342, a power efficiency calculator 344, a threshold adjuster 346, a comparator 348, a timer 350, and a protocol stack 351 including a primary entity 357 and a secondary entity 253. Processor 330 may be configured to execute instructions stored at memory 332 to perform the operations described herein. In some implementations, processor 330 includes or corresponds to controller/processor 280, and memory 332 includes or corresponds to memory 282. Memory 332 may also be configured to store one or more modes 352, one or more thresholds 354, and one or more threshold adjustment values 356. The one or more modes 352 may include a first mode, a second mode, a third mode, or a combination thereof, as an illustrative, non-limiting example. For example, each of the modes 352 may include different uplink transmission modes for a dual connection device. The dual connection device is configured for dual connectivity, such that the device (e.g., UE 115) may have an ENDC configuration.

In some implementations, at least one mode may be a default mode (e.g., a normal mode of operation). For example, the first mode may include the default mode. To illustrate, UE 115 may operate according to the default mode such that, if two associated entities (e.g., RLC entities) belong to different cell groups, UE 115 may transmit data to either first device 301 or second device 321 if a total amount of data pending for transmission in associated with first and secondary entities 357, 358 is greater than or equal to a threshold (e.g., 354) or, alternatively, to first device 301 if the total amount of data is less than the threshold. Additionally, or alternatively, at least one mode may be a power mode (e.g., a low power mode of operation or a power save mode of operation). For example, the second mode may include the power mode. Additionally, or alternatively, at least one mode may be a turbo mode. For example, the third mode may include the turbo mode. In some implementations, the first mode include default mode, second mode includes a power mode (e.g., a low power mode or a power save mode), and the third mode includes a turbo mode. Although described as including three modes, in other implementations, modes 352 may include two modes or more than three modes.

The one or more thresholds 354 may include one or more defaults thresholds. For example, thresholds 354 may include a threshold for at least one of modes 352. To illustrate, the one or more threshold 354 may include a first threshold for the first mode, a second threshold for the second mode, a third threshold for the third mode, or a combination thereof. In some implementations, the one or more thresholds 354 include a default threshold for at least one of modes 352.

The one or more threshold adjustment values 356 may include an adjustment value for at least one of modes 352. For example, the one or more threshold adjustment values 356 may be used to adjust, such as increase or decrease, at least one of thresholds 354 (e.g., a default threshold). In some implementations, the one or more threshold adjustment values 356 may include a first adjustment value and a second adjustment value. For example, the first value may be associated with increasing a threshold and the second value may be associated with decreasing the threshold. In some implementations, the one or more adjustment values 356 include at least one default adjustment value, at least one adjustment value dynamically determined by UE 115, or a combination thereof. To illustrate, UE 115 may dynamically determine at least one adjustment value based on an amount of buffered data, a power level of UE 115, a priority of buffered data, or a combination, as illustrate, non-limiting examples.

Transmitter 334 is configured to transmit data to one or more other devices, and receiver 336 is configured to receive data from one or more other devices. For example, transmitter 334 may transmit data, and receiver 336 may receive data, via a network, such as a wired network, a wireless network, or a combination thereof. For example, UE 115 may be configured to transmit and/or receive data via a direct device-to-device connection, a LAN, a WAN, a modem-to-modem connection, the Internet, intranet, extranet, cable transmission system, cellular communication network, any combination of the above, or any other communications network now known or later developed within which permits two or more electronic devices to communicate. In some implementations, transmitter 334 and receiver 336 may be replaced with a transceiver. Additionally, or alternatively, transmitter 334, receiver 336, or both may include or correspond to one or more components of UE 115 described with reference to FIG. 2.

Protocol stack 351 include primary entity 357 and secondary entity 358. Additionally, protocol stack 351 may include one or more layers, as described further herein at least with reference to FIG. 4. In some implementations, protocol stack 351 includes multiple RLC layers. The multiple RLC layers may include a first RLC layer for primary entity 357 and a second RLC layer for secondary entity 358. The first RLC layer and the second RLC layer may belong to different cell groups or to the same cell group. Protocol stack 351 may also include a PDCP layer configured to send or route data, such as PDUs, to the one of the multiple RLC layers. Additionally, in some implementations, protocol stack 351 includes an application layer configured to provide data to the PDCP layer.

Buffer 338 is configured to buffer data. For example, buffer 338, such as a data buffer, may be configured to buffer PDCP data, RLC data, or both, for transmission. To illustrate, buffer 338 may be configured to store an amount (e.g., a volume) of PDCP data and an amount (e.g., a volume) of RLC data. In some implementations, the PDCP data may include one or more PDCP PDUs.

Mode selector 340 may be configured to select one of modes 352. For example, mode selector 340 may select one of modes 352 based on a user input received via UE 115, a message or an instruction received from one of first device 301 or second device 321, a selection made by one or more components of UE 115, or a combination thereof. For example, UE 115 may select a mode, such as second mode (e.g., a low power mode), based on or in response to a power level of a power source (e.g., a battery) of UE 115 being less than or equal to a threshold. As another example, UE 115 may select a mode, such as third mode (e.g., a turbo mode), based on or in response to a priority of data to be communicated, an amount of data to be communicated, or a combination thereof.

Data rate calculator 342 is configured to determine an amount of data (or a data rate of data) provided to or from one or more entities (of protocol stack 351). The amount of data and/or the data rate may be determined for a time period, such as a 5 seconds, 10 seconds, 15 seconds, etc., as illustrative, non-limiting examples. To illustrate, data rate calculator 342 may calculate a first data rate corresponding to a first entity, such as primary entity 357, during a first time period and may calculate a second data rate corresponding to a second entity, such as secondary entity 358, during a second time period. In some implementations, first time period and second time period are the same time period.

Power efficiency calculator 344 is configured to determine a power transmission efficiency to one or more entities. The power transmission efficiency may be determined for a time period, such as a 5 seconds, 10 seconds, 15 seconds, etc., as illustrative, non-limiting examples. To illustrate, power efficiency calculator 344 may calculate a first power efficiency corresponding to a first entity, such as primary entity 357, during a first time period and may calculate a second power efficiency corresponding to a second entity, such as secondary entity 358, during a second time period. In some implementations, first time period and second time period are the same time period.

To determine power efficiency, power efficiency calculator 344 may determine a total number of transmission bits, such as a first total number of primary transmission bits and a second total number of secondary bits, during a time period. Additionally, power efficiency calculator 344 may determine an average transmission power (in decibel-milliwatts (dBm)) for one or more entities. For example, power efficiency calculator 344 may determine a total transmission power or an average transmission power for the one or more entities during a time period. To illustrate, power efficiency calculator 344 may determine a first average power for primary transmission (TX_Primary_Power) MAC layer and a second average power for secondary (TX_Secondary_Power) MAC layer during the time period. After determining the total number of transmission bits and the average power during the time period, power efficiency calculator 344 calculates power efficiency values corresponding to first device 301 and second device 321 as power per bits (e.g., dBM/bits). To illustrate, power efficiency calculator 344 calculates a first power efficiency value corresponding to primary entity 357 and a second power efficiency value corresponding to secondary entity 358.

Threshold adjuster 346 is configured to adjust threshold 354 based on threshold adjustment value 356. For example, threshold adjuster 346 may increase or decrease threshold 354 based on threshold adjustment value 356. To illustrate, if UE 115 determines to send PDCP PDUs to primary entity 357, threshold adjuster 346 may increase threshold value by adding adjustment value 356 to threshold 354, as an illustrative, non-limiting example. Alternatively, if UE 115 determines to send PDCP PDUs to secondary entity 358, threshold adjuster 346 may decrease threshold value by subtracting adjustment value 356 from threshold 354, as an illustrative, non-limiting example.

Comparator 348 is configured to perform a comparison between two values. For example, comparator 348 may compare an amount of buffered data to a threshold (or an adjusted threshold). Additionally, or alternatively, comparator 348 may compare a first data rate associated with primary entity 357 and a second data rate associated with secondary entity 358. According, comparator 348 may determine which of the first data rate and the second data rate is a higher data rate, is a lower data rate, or whether the first data rate and the second data rate are equal. Additionally, or alternatively, comparator 348 may compare a first power efficiency value associated with primary entity 357 and a second power efficiency value associated with secondary entity 358. According, comparator 348 may determine which of the first power efficiency value and the second power efficiency value has higher power efficiency, such as higher transmission power efficiency, has lower power efficiency, or whether the first power efficiency value and the second power efficiency value are equal.

Timer 350 is configured to determine when one or more time periods have elapsed. The one or more time periods may include a time period having a predetermined (e.g., fixed) duration or a time period determined and/or indicated by UE 115, or another device, such as by base station 105, first device 301, second device 321, or a core, such as an EPC or a 5GC.

During operation of wireless communications system 300, mode selector 340 of UE 115 may select one of modes 352. For example, mode selector 340 may select a first mode (e.g., a default mode), a second mode (e.g., a power mode), or a third mode (e.g., a turbo mode). Based on the selected mode, UE 115 may perform one or more operations.

Based on the first mode being selected, UE 115 may determine a total amount of data pending for transmission in associated with first and secondary entities 357, 358, such as a total amount of data at buffer 338. Comparator 348 may compare the determined total amount of data and threshold 354. If the total amount of data is less than or equal to threshold 354, UE 115 may determine to use a primary RLC layer. Alternatively, if the total amount of data is greater than threshold 354, UE 115 may determine to use the primary RLC layer or a secondary RLC layer.

Additionally, UE 115 may transmit a BSR 360, a PHR 361, or both. For example, UE 115 may transmit a first BSR for or via the primary path, a second BSR for or via the secondary path, or a combination thereof. Additionally, or alternatively, UE 115 may transmit a first PHR for or via the primary path, a second PHR for or via the secondary path, or a combination thereof. Based on BSR 360, PHR 361, or a combination thereof, UE 115 may receive a first set of one or more uplink grants 363 from first device 301, a second set of one or more uplink grants 364 from second device 321, or a combination thereof. UE 115 may transmit data 362 based on the received one or more uplink grants 363 or the received one or more uplink grants 364.

Based on the second mode being selected, power efficiency calculator 344 of UE 115 may determine a first power efficiency value associated with primary entity 357 and a second power efficiency value associated with secondary entity 358. Comparator 348 may compare the first power efficiency value and the second power efficiency value to determine which has greater efficiency. Based on which of the first power efficiency value and the second power efficiency value is determined to have greater efficiency, threshold adjuster 346 may adjust threshold 354 using threshold adjustment value 356. For example, if the first power efficiency value has greater efficiency, UE 115 may determine to send data (e.g., 362) to primary entity 357, such as to a primary RLC layer, and threshold 354 is adjusted (e.g., increased) by threshold adjustment value 356. Based on selecting to send data to primary entity 357, UE 115 may submit a larger BSR value (e.g., 360) corresponding to primary entity 357, to network such that the network (e.g., first device 301, second device 321, or an EPC/5GC) issues more UL grants to UE 115 for first device 301. In some implementations, UE 115 may also report a smaller BSR (e.g., 360), a smaller PHR (e.g., 361), or both, corresponding to secondary entity 358.

Alternatively, if the second power efficiency value is determined to have greater efficiency, UE 115 may determine to send data (e.g., 362) to secondary entity 358, such as to a secondary RLC layer, and threshold 354 is adjusted (e.g., decreased) by threshold adjustment value 356. Based on selecting to send data to secondary entity 358, UE 115 may submit a larger BSR value (e.g., 360) corresponding to secondary entity 358, to network such that the network (e.g., first device 301, second device 321, or an EPC/5GC) issues more UL grants to UE 115 for second device 321. In some implementations, UE 115 may also report a smaller BSR (e.g., 360), a smaller PHR (e.g., 361), or both, corresponding to primary entity 357.

Based on the third mode being selected, data rate calculator 342 may determine a first data rate associated with primary entity 357 and a second data rate associated with secondary entity 358. Comparator 348 may compare the first data rate and the second data rate to determine which has greater efficiency (e.g., performance). Based on which of the first data rate and the second data rate is determined to have greater efficiency, threshold adjuster 346 may adjust threshold 354 using threshold adjustment value 356. For example, if the first data rate has greater efficiency, UE 115 may determine to send data (e.g., 362) to primary entity 357, such as to a primary RLC layer, and threshold 354 is adjusted (e.g., increased) by threshold adjustment value 356. Based on selecting to send data to first device 301, UE 115 may submit a larger BSR value (e.g., 360) corresponding to primary entity 357, to network such that the network (e.g., first device 301, second device 321, or an EPC/5GC) issues more UL grants to UE 115 for first device 301. In some implementations, UE 115 may also report a smaller BSR (e.g., 360), a smaller PHR (e.g., 361), or both, corresponding to secondary entity 358.

Alternatively, if the second data rate is determined to have greater efficiency, UE 115 may determine to send data (e.g., 362) to secondary entity 358, such as a secondary RLC layer, and threshold 354 is adjusted (e.g., increased) by threshold adjustment value 356. Based on selecting to send data to secondary entity 358, UE 115 may submit a larger BSR value (e.g., 360) corresponding to secondary entity 358, to network such that the network (e.g., first device 301, second device 321, or an EPC/5GC) issues more UL grants to UE 115 for second device 321. In some implementations, UE 115 may also report a smaller BSR (e.g., 360), a smaller PHR (e.g., 361), or both, corresponding to primary entity 357.

In some implementations, UE 115 may operate according to one mode (of the one or more modes 352) during a first time period and may operation according to another mode (of the one or more modes 352) during a second time period. The second time period may be prior to or subsequent to the first time period. To illustrate, UE 115 may operate according to the first mode during the first time period, and may operate according to the second mode or the third mode during the second time period. As another example, UE 115 may operate according to the second mode during the first time period, and may operate according to the third time period during the second mode.

As described with reference to FIG. 3, the present disclosure enables enable improved performance, improved throughput, reduced latency, or a combination thereof, as compared to a conventional approach in which a default, static uplink data split threshold (e.g., ul-DataSplitThreshold) is used. For example, the second mode (e.g., the low power mode or power saving mode) may improve efficiency by providing a lower energy cost per UL bit as compared to the conventional approach. As another example, the third mode (e.g., a turbo mode) may improve performance by providing higher uplink throughput and/or low latency as compared to the conventional approach. Additionally, by selecting one of multiple modes and adjusting the threshold, such as a default threshold, UE 115 may advantageously take into account one or more operating conditions of UE 115 and thereby improve an operation (e.g., performance and/or efficiency) of UE 115. For example, the second mode (e.g., the power mode) may be selected when UE 115 has a low power condition. As another example, the third mode (e.g., the turbo mode) may be selected when a software application executing at UE 115, has a lot of data to send with low latency.

Figure 4:
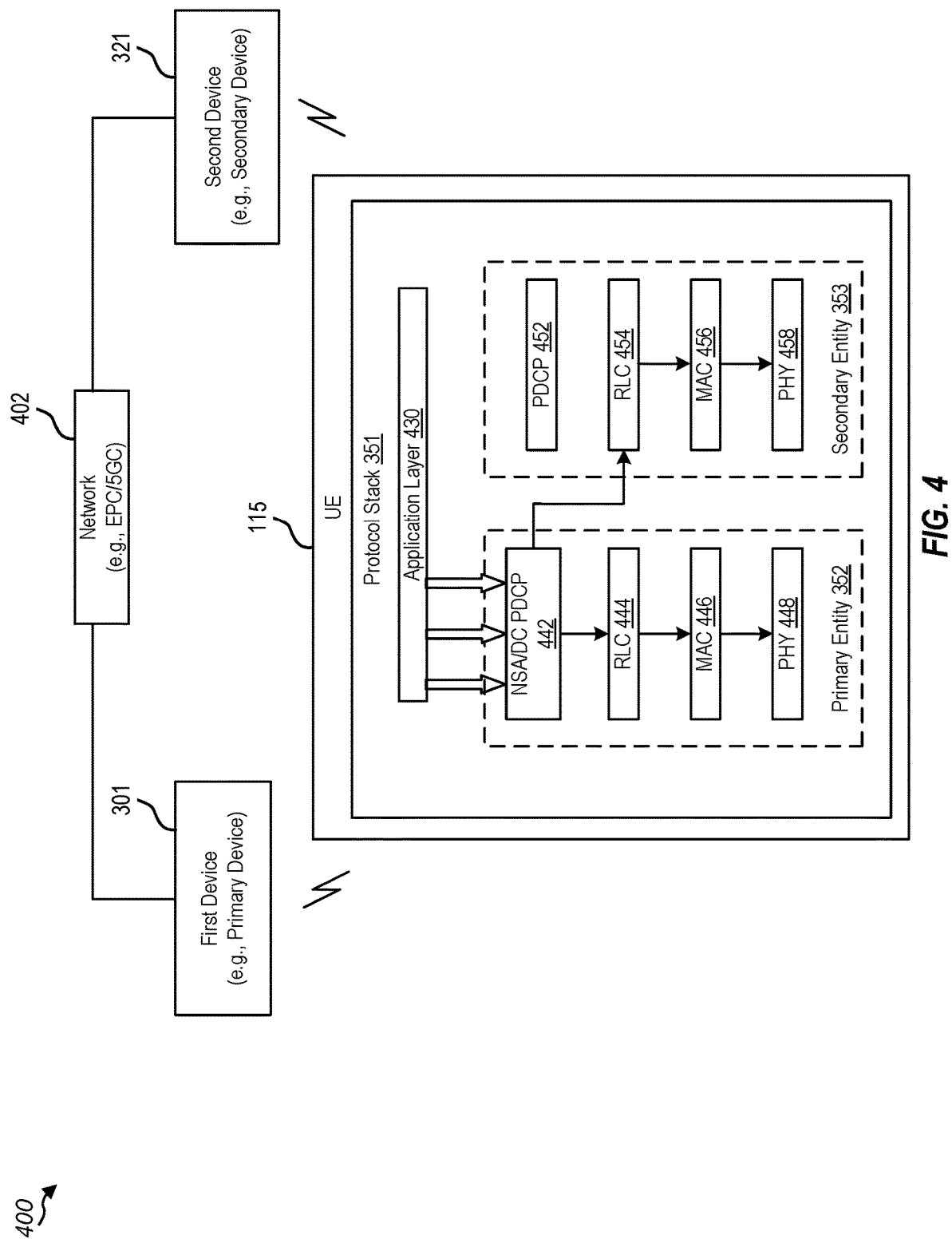
FIG. 4 is a block diagram illustrating an example of a wireless communications system for UL transmissions for an ENDC dual connection device.

Referring to FIG. 4, an example of an ENDC connection is shown. For example, FIG. 4 illustrates an example of a wireless communications system 400 that supports sharing of frequency generator settings in accordance with aspects of the present disclosure. In some examples, wireless communications system 400 may implement aspects of wireless communication system 100 and/or wireless communication system 300. As shown, wireless communication system 400 includes first device 301, second device 321, UE 115, and network 402. Additionally, FIG. 4 illustrates UL transmission architecture of an application layer of UE 115.

Network 402 may include an EPC/5GC, such as an EPC, a 5GC, or both. Network 402 is coupled to each of first device 301 and second device 321. For example, network 402 may be coupled to each of first device 301 and second device 321 via one or more wired connections, one or more wireless connections, or a combination thereof.

UE 115 includes protocol stack 351. As an illustrative, non-limiting example of protocol stack 351, protocol stack 351 includes an application layer 430, primary entity 357, and secondary entity 358. Primary entity 357 includes a non-stand alone (NSA)/dual connectivity (DC) PDCP layer 442, a RLC layer 444, a MAC layer 446, and a physical (PHY) layer 448. Secondary entity 358 includes a PDCP layer 452, a RLC layer 454, a MAC layer 456, and a PHY layer 458.

As shown, when UE 115 is configured as a NSA/DC communication device, application layer 430 is configured to send transmit uplink PDCP PDUs to NSA/DC PDCP 442 of primary entity 357. In some implementations, NSA/DC PDCP layer 442 makes send (e.g., route) data to primary RLC 444 or secondary RLC 454. For example, the data may be routed based on one or more determinations, one or more calculations, or a combination thereof, as described with reference to at least FIGS. 3 and 5-8.

Figure 5:
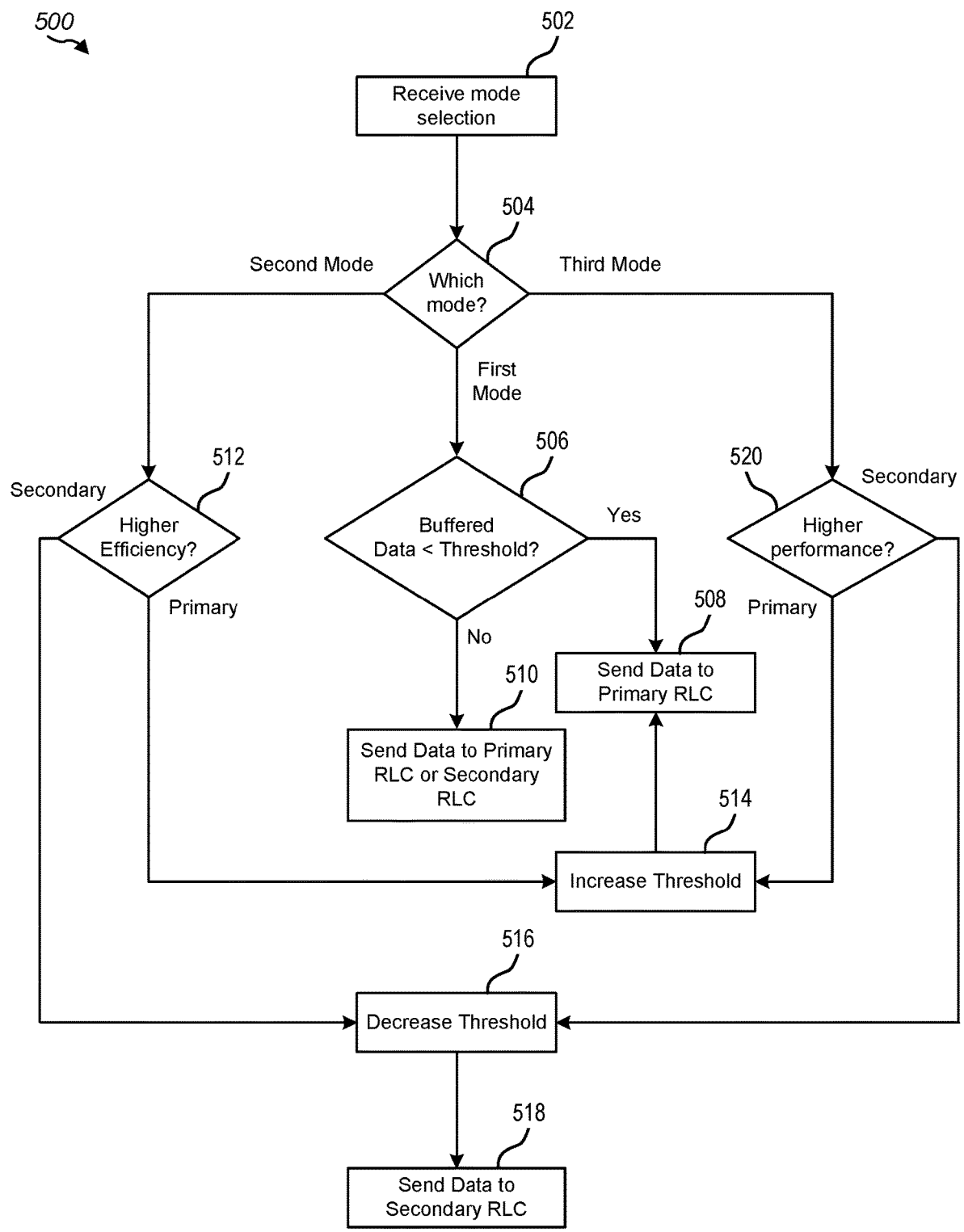
FIG. 5 illustrates an example of a flow diagram of a method of operating a UE.

FIG. 5 depicts a flow diagram illustrating an example of a method 500 for UL transmission when a UE is configured as an EN-DC connection device. Method 500 may be performed by UE 115, such as one or more components of UE 115. In some other implementations, method 500 of FIG. 5 may be performed by an apparatus configured for wireless communication. For example, the apparatus may include at least one processor, and a memory coupled to the processor. The processor may be configured to perform operations of method 500 of FIG. 5. In some other implementations, method 500 of FIG. 5 may be performed or executed using a non-transitory computer-readable medium having program code recorded thereon. The program code may be program code executable by a computer for causing the computer to perform operations of method 500 of FIG. 5.

The method 500 includes receiving a mode selection, at 502. At 504, the method 500 includes determining which mode is selected. For example, the mode may be selected from a plurality of modes, such as modes 352. The mode may be selected by the UE or by a user of the UE. In some implementations, the plurality of modes includes a first mode, a second mode, and a third mode. The first mode may include or correspond to a default mode, the second mode may include or correspond to a power mode (e.g., a low power mode or a power save mode), and the third mode may include or correspond to a turbo mode.

Based on a determination, at 504, that the first mode is selected, method 500 advances to 506. Method 500 includes, at 506, determining whether an amount of buffered data is less than a threshold. If the amount of buffered data is determined (at 506) to be less than a threshold, method 500 includes sending data to a primary RLC layer, at 508. The primary RLC layer may include or correspond to RLC layer 444. For example, the threshold may include or correspond to threshold 354, such as a default threshold. Alternatively, if the amount of buffered data is determined (at 506) to be greater than or equal to the threshold, method 500 includes sending data to the primary RLC layer or a secondary RLC layer, at 510. The secondary RLC layer may include or correspond to RLC layer 454.

Based on a determination, at 504, that the second mode is selected, method 500 advances to 512. Method 500 includes, at 512, determining which is higher between a first power efficiency value associated with a primary entity, such as primary entity 357, and a second power efficiency value associated with a second entity, such as secondary entity 358. The first power efficiency value and the second power efficiency value may be determined/calculated by power efficiency calculator 344. The comparison between the first power efficiency value and the second power efficiency value may be determined by comparator 348.

If the first power efficiency value associated with the primary entity is determined (at 512) to have higher efficiency, method 500 includes adjusting a threshold, at 514. To illustrate, the threshold (e.g., 354) may be increased at 514. For example, the threshold may be increased by threshold adjustment value 356. After adjusting (e.g., increasing) the threshold (at 514), method 500 advances to send data to the primary RLC layer, at 508.

Alternatively, if the second power efficiency value associated with the secondary entity is determined (at 512) to have higher efficiency, method 500 includes adjusting the threshold, at 516. To illustrate, the threshold (e.g., 354) may be decreased at 516. For example, the threshold may be decreased by threshold adjustment value 356. After adjusting (e.g., decreasing) the threshold (at 516), method 500 advances to send data to the second RLC layer, at 518.

Based on a determination, at 504, that the third mode is selected, method 500 advances to 520. Method 500 includes, at 520, determining which is higher between a first amount of data associated with the primary entity, such as primary entity 357, and a second amount of data associated with the second entity, such as secondary entity 358. Additionally, or alternatively, method 500 may include, at 520, determining which is higher between a first data rate associated with the primary entity, such as primary entity 357, and a second data rate associated with the second entity, such as secondary entity 358. The first amount of data and the second amount of data, or the first data rate and the second data rate, may be determined/calculated by data rate calculator 342. The comparison between the first amount of data and the second amount of data, or the first data rate and the second data rate, may be determined by comparator 348.

If the primary entity, e.g., the first amount of data or the first date rate, is determined (at 520) to have higher performance, method 500 includes adjusting (e.g., increasing) the threshold, at 514. For example, the threshold may be increased by threshold adjustment value 356. After adjusting (e.g., increasing) the threshold (at 514), method 500 advances to 508. Alternatively, if the secondary entity, e.g., the second amount of data or the second date rate, is determined (at 512) to have higher performance, method 500 includes adjusting (e.g., decreasing) the threshold, at 516. For example, the threshold may be decreased by threshold adjustment value 356. After adjusting (e.g., decreasing) the threshold (at 516), method 500 advances to 518.

In some implementations, after sending the data to the primary RLC layer, at 510 or 508, or sending the data to the secondary RLC layer, at 510 or 518, method 500 may advance to 502. Accordingly, in some implementations, after first mode is selected and data is sent at 508 or 510, the method 500 subsequently selects second mode or third mode. Alternatively, in some implementations, after second mode is selected and data is sent at 508 or 518, the method 500 subsequently selects first mode or third mode. Alternatively, in some implementations, after third mode is selected and data is sent at 508 or 518, the method 500 subsequently selects first mode or second mode.

As described with reference to FIG. 5, the present disclosure enables enable improved performance, improved throughput, reduced latency, or a combination thereof, as compared to a conventional approach in which a default, static uplink data split threshold (e.g., ul-DataSplitThreshold) is used. For example, the second mode (e.g., the low power mode or power saving mode) may improve efficiency by providing a lower energy cost per UL bit as compared to the conventional approach. As another example, the third mode (e.g., a turbo mode) may improve performance by providing higher uplink throughput and/or low latency as compared to the conventional approach. Additionally, by selecting one of multiple modes and adjusting the threshold, such as a default threshold, the UE may advantageously take into account one or more operating conditions of the UE and thereby improve an operation (e.g., performance and/or efficiency) of the UE. For example, the second mode (e.g., the power mode) may be selected when the UE has a low power condition. As another example, the third mode (e.g., the turbo mode) may be selected when a software application executing at the UE has a lot of data to send with low latency.

Figure 9:
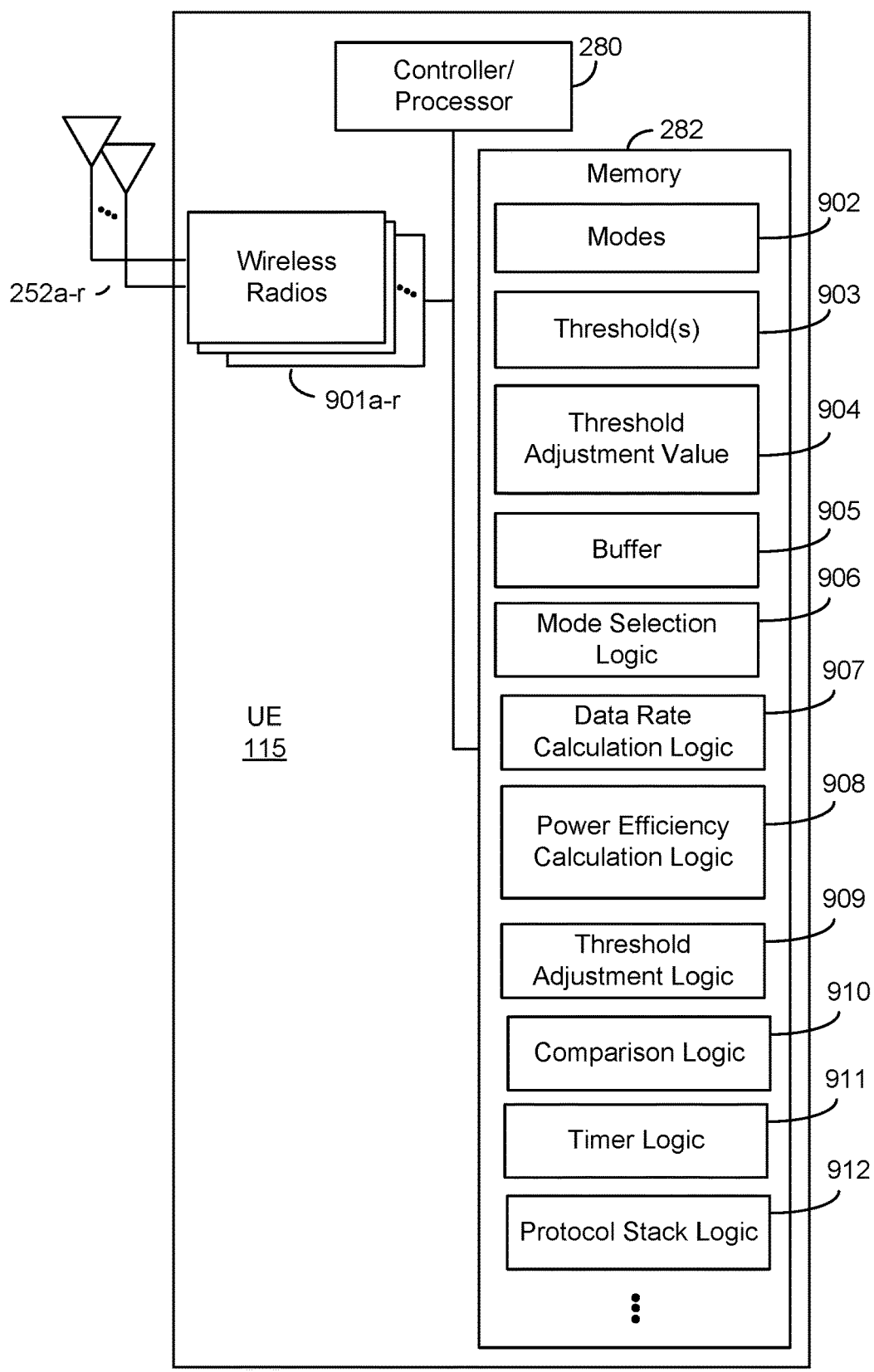
FIG. 9 is a block diagram conceptually illustrating a design of a UE according to aspects of the present disclosure.

FIGS. 6-8 are block diagrams illustrating example blocks executed by a UE configured according to one or more aspects of the present disclosure. The example blocks will also be described with respect to UE 115 as illustrated in FIG. 9. FIG. 9 is a block diagram illustrating UE 115 configured according to one aspect of the present disclosure. UE 115 includes the structure, hardware, and components as illustrated for UE 115 of FIG. 2 or 3. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 901a-r and antennas 252a-r. Wireless radios 901a-r includes various components and hardware, as illustrated in FIG. 2 for UE 115, including modulator/demodulators 254a-r, MIMO detector 256, receive processor 258, transmit processor 264, and TX MIMO processor 266.

As shown, memory 282 may include modes 902, one or more thresholds 903, a threshold adjustment value 904, a buffer 905, mode selection logic 906, data rate calculation logic 907, power efficiency calculation logic 908, threshold adjustment logic 909, comparison logic 910, timer logic 911, and protocol stack logic 912. Modes 902, one or more thresholds 903, a threshold adjustment value 904 may include or correspond to modes 352, one or more thresholds 354, and threshold adjustment value 356, respectively. Buffer 905 may include or correspond to buffer 338. Mode selection logic 906 may include or correspond to processor 330 or mode selector 340. Data rate calculation logic 907 may include or correspond to processor 330 or data rate calculator 342. Power efficiency calculation logic 908 may include or correspond to processor 330 or power efficiency calculator 344. Threshold adjustment logic 909 may include or correspond to processor 330 or threshold adjuster 346. Comparison logic 910 may include or correspond to processor 330 or comparator 348. Timer logic 911 may include or correspond to processor 330 or timer 350. The protocol stack logic 912 may include or correspond to protocol stack 351. In some aspects, buffer 905, mode selection logic 906, data rate calculation logic 907, power efficiency calculation logic 908, threshold adjustment logic 909, comparison logic 910, timer logic 911, protocol stack logic 912, or a combination thereof, may include or correspond to processor(s) 280. UE 115 may receive signals from and/or transmit signal to a base station, such as base station 105, first device 301, or second device 321.

Referring to FIG. 6, at block 600, the UE, while in a dual connectivity configuration, adjusts a threshold. To illustrate, the UE may adjust a threshold 903 base on a threshold adjustment value 904 using the threshold adjustment logic 909. For example, the threshold may include a ul-DataSplit-Threshold. In some implementations, the dual connectivity configuration may a New Radio E-UTRA Dual Connectivity (NE-DC) configuration or other dual connectivity configuration.

At block 601, the UE routes data to one of multiple RLC layers based on the adjusted threshold. To illustrate, the UE may route the data to a RLC layer of a protocol stack using protocol stack logic 912. The data may include a PDU.

At block 602, the UE transmits the data. To illustrate, the UE may transmit the data via wireless radios 901a-r and antennas 252a-r.

In some implementations, the multiple RLC layers include a first RLC layer and a second RLC layer. The first RLC layer and the second RLC layer may belong to different cell groups or to the same cell group. Additionally, or alternatively, the data may be routed from a PDCP layer to the one of the multiple RLC layers. For example, a block may be included in which the UE provides the data from an application layer to the PDCP layer. In some implementations, a first set of layers corresponds to a primary entity, the first set of layers including the first RLC layer. Additionally, or alternatively, a second set of layers corresponds to a secondary entity, the second set of layers including the second RLC layer. In some such implementations, the PDCP corresponds to the primary entity.

In some implementations, a block may be included in which the UE determines a first number of bits sent by a primary RLC entity of the UE during a first time period and determines a second number of bits sent by a secondary RLC entity of the UE during a second time period. To illustrate, the UE may determine the first and second number of bits using the data rate calculation logic 907 or the power efficiency calculation logic 908. The first time period and the second time period are the same time period or may be different time periods. Additionally, or alternatively, a block may be included in which the UE determines a first power value associated with the primary RLC entity corresponding to the first time period, and determines a second power value associated with the secondary RLC entity corresponding to the second time period. To illustrate, the UE may determine the first and second power values using the power efficiency calculation logic 908. The first power value may correspond to a transmit power of a primary medium access control (MAC) layer, the second power value may correspond to a transmit power of a secondary MAC layer, or both. In some implementations, each of the first power value and the second power value includes an average transmission power in dBm.

In some implementations, a block may be included in which the UE calculates a first power efficiency value associated with the primary RLC entity, and calculates a second power efficiency value associated with the secondary RLC entity. To illustrate, the UE may determine the first and second power efficiency values using the power efficiency calculation logic 908. For example, the first power efficiency value may be calculated based on the first number of bits and the first power value, the second power efficiency value is calculated based on the second number of bits and the second power value, or both. In some such implementations, each of the first power efficiency value and the second power efficiency value includes a power per bit value in average transmission power in decibel-milliwatts (dBm) per bit.

In some implementations, a block may be included in which the UE performs a comparison based on the first power efficiency value and the second power efficiency value and selects the one of multiple RLC layers based on a result of the comparison. To illustrate, the UE may perform the comparison using the comparison logic 910. In some such implementations, the threshold is adjusted based on the selected RLC layer. Additionally, or alternatively, performing the comparison may include determining which of the first power efficiency value and the second power efficiency value has higher power efficiency.

In some implementations, a block may be included in which the UE determines a first power efficiency value corresponding to a primary entity and a second power efficiency value corresponding to a secondary entity. To illustrate, the UE may determine the first and second power efficiency values using the power efficiency calculation logic 908. In some such implementations, another block may be included in which the UE routes the data to one of multiple RLC layers based on a comparison between the first power efficiency value and the second power efficiency value. To illustrate, the UE may route the data using the protocol stack logic 912.

In some implementations, a block may be included in which the UE calculates a first data rate associated with the primary RLC entity corresponding to the first time period, calculates a second data rate associated with the secondary RLC entity corresponding to the second time period, or both. To illustrate, the UE may determine the first and second data rates using the data rate calculation logic 907. Each of the first date rate and the second data rate may include an average of bits per unit of time, the unit time including seconds, milliseconds, or microseconds. Additionally, or alternatively, a block may be included in which the UE performs a comparison based on the first data rate and the second data rate, and selects the one of multiple RLC layers based on a result of the comparison. To illustrate, the UE may perform the comparison using the comparison logic 910. In some such implementations, the threshold is adjusted based on the selected RLC layer. Additionally, performing the comparison may include determining which of the first data rate and the second data rate has higher performance.

In some implementations, a block may be included in which the UE determines a first data rate corresponding to a primary entity and a second data rate corresponding to a secondary entity. To illustrate, the UE may determine the first and second data rates using the data rate calculation logic 907. In some such implementations, another block may be included in which the UE routes the data to one of multiple RLC layers based on a comparison between the first data rate and the second data rate. To illustrate, the UE may route the data using the protocol stack logic 912.

In some implementations, a block may be included in which the UE, based on a selection of the one of the multiple RLC layers corresponding to a primary entity, determines the adjustment value. For example, adjusting the threshold may include adding the adjustment value to the threshold to generate the adjusted threshold. In some such implementations, a block may be included in which the UE determines a BSR corresponding to a primary entity, a PHR corresponding to the primary entity, or both. Additionally, the UE may, based on the selection of the one of the multiple RLC layers corresponding to the primary entity, increase a BSR value of the BSR to generate a modified BSR, and transmits, to a primary network device, the modified BSR, the PHR, or both. Additionally, or alternatively, a block may be included in which the UE determines a BSR corresponding to a secondary entity, a PHR corresponding to the secondary entity, or both. Based on the selection of the one of the multiple RLC layers corresponding to the primary entity, the UE may decrease a BSR value of the BSR corresponding to the secondary entity to generate a modified BSR corresponding to the secondary entity, decrease a PHR value of the PHR corresponding to the secondary entity to generate a modified PHR corresponding to the secondary entity, or both, and transmits, the a secondary network device, the modified BSR corresponding to the secondary entity, the modified PHR corresponding to the secondary entity, or both.

In some implementations, a block may be included in which the UE, based on a selection of the one of the multiple RLC layers corresponding to a secondary entity, determines the adjustment value. For example, adjusting the threshold may include subtracting the adjustment value from the threshold to generate the adjusted threshold. In some such implementations, a block may be included in which the UE determines a BSR corresponding to the secondary entity, a PHR corresponding to the secondary entity, or both. Additionally, the UE may, based on the selection of the one of the multiple RLC layers corresponding to the secondary entity, increase a BSR value of the BSR to generate a modified BSR, and transmits, to a secondary network device, the modified BSR, the PHR, or both. Additionally, or alternatively, a block may be included in which the UE determines a BSR corresponding to a primary entity, a PHR corresponding to the primary entity, or both. Based on the selection of the one of the multiple RLC layers corresponding to the secondary entity, the UE may decrease a BSR value of the BSR corresponding to the primary entity to generate a modified BSR corresponding to the primary entity, decrease a PHR value of the PHR corresponding to the primary entity to generate a modified PHR corresponding to the primary entity, or both, and transmits, the a primary network device, the modified BSR corresponding to the primary entity, the modified PHR corresponding to the primary entity, or both.

In some implementations, a block may be included in which the UE, after transmission of the data (e.g., first data) and while in the dual connectivity configuration, determines an amount of data pending for transmission. To illustrate, the UE may determine the amount of data pending for transmission using the buffer, the data rate calculation logic 907, or a combination thereof. For example, the amount of data pending for transmission includes an amount of PDCP data. In some such implementations, a block may be included in which the UE performs a comparison between the amount of data pending for transmission and the threshold, and routes additional data (e.g., second data) to one of the multiple RLC layers based on the comparison. To illustrate, the UE may perform the comparison using the comparison logic 910. For example, if the amount of data pending for transmission is greater than or equal to the threshold, the additional data is routed to a primary RLC layer of the multiple RLC layers or a secondary RLC layer of the multiple RLC layers. Alternatively, if the amount of data pending for transmission is less than the threshold, the additional data is routed to a primary RLC layer of the multiple primary RLC layers. In some such implementations, the UE may transmit the additional data. To illustrate, the UE may transmit the additional data via wireless radios 901a-r and antennas 252a-r. The additional data may include PDCP data, such as a PDCP PDU.

Referring to FIG. 7, at block 700, the UE, while in a dual connectivity configuration, determine a first data rate corresponding to a primary entity and a second data rate corresponding to a secondary entity. To illustrate, the UE may determine the first and second data rates using the data rate calculation logic 907. In some implementations, the dual connectivity configuration may a NE-DC configuration or other dual connectivity configuration.

At block 701, the UE routes data to one of multiple RLC layers based on a comparison between the first data rate and the second data rate. To illustrate, the UE may route the data to a RLC layer of a protocol stack using protocol stack logic 912.

At block 702, the UE transmits the data. To illustrate, the UE may transmit the data via wireless radios 901a-r and antennas 252a-r.

Referring to FIG. 8, at block 800, the UE, while in a dual connectivity configuration, determine a first power efficiency value corresponding to a primary entity and a second power efficiency value corresponding to a secondary entity. To illustrate, the UE may determine the first and second power efficiency values using the data rate calculation logic 907. In some implementations, the dual connectivity configuration may a NE-DC configuration or other dual connectivity configuration.

At block 801, the UE routes data to one of multiple radio link control (RLC) layers based on a comparison between the first power efficiency value and the second power efficiency value. To illustrate, the UE may route the data to a RLC layer of a protocol stack using protocol stack logic 912.

At block 802, the UE transmits the data. To illustrate, the UE may transmit the data via wireless radios 901a-r and antennas 252a-r.

It is noted that one or more blocks (or operations) described with reference to FIGS. 6-8 may be combined with one or more blocks (or operations) of another of figure. For example, one or more blocks of FIGS. 6-8 may be combined with one or more blocks (or operations) of another of FIG. 2, 3, or 9. Additionally, or alternatively, one or more operations described above with reference to FIGS. 1-5 may be combine with one or more operations described with reference to FIG. 6-8.

In some aspects, techniques for enabling an uplink transmission for a dual connectivity connection device may include additional aspects, such as any single aspect or any combination of aspects described below or in connection with one or more other processes or devices described elsewhere herein. In some aspects, enabling an uplink transmission for a dual connectivity connection device may include an apparatus that adjusts, while in a dual connectivity configuration, a threshold; routes, data to one of multiple RLC layers based on the adjusted threshold; and transmits the data. In some implementations, the apparatus includes a wireless device, such as a UE. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein. In some implementations, operations described with reference to the apparatus may include a method for wireless communication.

In a first aspect, the dual connectivity configuration corresponds to an ENDC configuration.

In a second aspect, alone or in combination with the first aspect, the threshold includes a ul-DataSplitThreshold.

In a third aspect, alone or in combination with one or more of the first through second aspects, the data includes a PDU.

In a fourth aspect, alone or in combination with one or more of the first through third aspects, the multiple RLC layers include a first RLC layer and a second RLC layer.

In a fifth aspect, in combination with the fifth aspect, the first RLC layer and the second RLC layer belong to different cell groups or to the same cell group.

In a sixth aspect, alone or in combination with one or more of the first through fifth aspects, the data is routed from a PDCP layer to the one of the multiple RLC layers.

In a seventh aspect, in combination with the sixth aspect, the apparatus provides the data from an application layer to the PDCP layer.

In an eighth aspect, alone or in combination with one or more of the first through seventh aspects, a first set of layers corresponds to a primary entity, the first set of layers including the first RLC layer.

In a ninth aspect, in combination with the eighth aspect, a second set of layers corresponds to a secondary entity, the second set of layers including the second RLC layer.

In a tenth aspect, alone or in combination with one or more of the eighth through ninth aspects, the PDCP corresponds to the primary entity.

In an eleventh aspect, alone or in combination with one or more of the first through tenth aspects, the apparatus receives a selection of one of multiple uplink transmissions modes.

In a twelfth aspect, in combination with the eleventh aspect, the selection is received via a user interface of the apparatus or determined by the apparatus.

In a thirteenth aspect, in combination with one or more of the eleventh through twelfth aspects, the multiple uplink transmission modes include a power mode and a turbo mode.

In a fourteenth aspect, the apparatus determines a first number of bits sent by a primary RLC entity of the apparatus during a first time period.

In a fifteenth aspect, in combination with the fourteenth aspect, the apparatus determines a second number of bits sent by a secondary RLC entity of the apparatus during a second time period.

In a sixteenth aspect, in combination with the fifteenth aspect, the first time period and the second time period are the same time period.

In a seventeenth aspect, alone or in combination with one or more of the fourteenth through sixteenth aspects, the apparatus determines a first power value associated with the primary RLC entity corresponding to the first time period.

In an eighteenth aspect, alone or in combination with one or more of the fifteenth through seventeenth aspects, the apparatus determines a second power value associated with the secondary RLC entity corresponding to the second time period.

In a nineteenth aspect, in combination with one or more of the seventeenth through eighteenth aspects, the first power value corresponds to a transmit power of a primary MAC layer.

In a twentieth aspect, in combination with one or more of the eighteenth through nineteenth aspects, the second power value corresponds to a transmit power of a secondary MAC layer.

In a twenty-first aspect, in combination with one or more of the eighteenth through twentieth aspects, each of the first power value and the second power value includes an average transmission power in dBm.

In a twenty-second aspect, in combination with one or more of the fifteenth through twenty-first aspects, the apparatus calculates a first power efficiency value associated with the primary RLC entity.

In a twenty-third aspect, in combination with the twenty-second aspect, the apparatus calculates a second power efficiency value associated with the secondary RLC entity.

In a twenty-fourth aspect, in combination with the twenty-second through twenty-third aspects, the first power efficiency value is calculated based on the first number of bits and the first power value.

In a twenty-fifth aspect, in combination with one or more of the twenty-third through twenty-fourth aspects, the second power efficiency value is calculated based on the second number of bits and the second power value.

In a twenty-sixth aspect, in combination with one or more of the twenty-third through twenty-fifth aspects, each of the first power efficiency value and the second power efficiency value includes a power per bit value in average transmission power in dBm per bit.

In a twenty-seventh aspect, in combination with one or more of the twenty-third through twenty-sixth aspects, the apparatus performs a comparison based on the first power efficiency value and the second power efficiency value.

In a twenty-eighth aspect, in combination with the twenty-seventh aspects, the apparatus selects the one of multiple RLC layers based on a result of the comparison.

In a twenty-ninth aspect, in combination with the twenty-eighth aspects, the threshold is adjusted based on the selected RLC layer.

In a thirtieth aspect, in combination with the twenty-ninth aspect, to perform the comparison, the apparatus determines which of the first power efficiency value and the second power efficiency value has higher power efficiency.

In a thirty-first aspect, the apparatus determines a first power efficiency value corresponding to a primary entity and a second power efficiency value corresponding to a secondary entity.

In a thirty-second aspect, in combination with the thirty-first aspect, the apparatus routes the data to one of multiple RLC layers based on a comparison between the first power efficiency value and the second power efficiency value.

In a thirty-third aspect alone or in combination with one or more of the fourteenth through sixteenth aspects, the apparatus calculates a first data rate associated with the primary RLC entity corresponding to the first time period.

In a thirty-fourth aspect alone or in combination with one or more of the fifteenth through sixteenth aspects, the apparatus calculates a second data rate associated with the secondary RLC entity corresponding to the second time period.

In a thirty-fifth aspect, in combination with the thirty-third aspects, each of the first date rate and the second data rate includes an average of bits per unit of time, and the unit time includes seconds, milliseconds, or microseconds.

In a thirty-sixth aspect, in combination with one or more of the thirty-fourth through thirty-fifth aspects, the apparatus performs a comparison based on the first data rate and the second data rate.

In a thirty-seventh aspect, in combination with the thirty-sixth aspect, the apparatus selects the one of multiple RLC layers based on a result of the comparison.

In a thirty-eighth aspect, in combination with the thirty-seventh aspect, the threshold is adjusted based on the selected RLC layer.

In a thirty-ninth aspect, in combination with one or more of the thirty-sixth through thirty-eighth aspects, to perform the comparison, the apparatus determines which of the first data rate and the second data rate has higher performance.

In a fortieth aspect, the apparatus determines a first data rate corresponding to a primary entity and a second data rate corresponding to a secondary entity.

In a forty-first aspect, in combination with the fortieth aspects, the apparatus routes the data to one of multiple RLC layers based on a comparison between the first data rate and the second data rate.

In a forty-second aspect, alone or in combination with one or more of the first through forty-first aspects, the apparatus, based on a selection of the one of the multiple RLC layers corresponding to a primary entity, determines the adjustment value.

In a forty-third aspect, in combination with the forty-second aspect, to adjust the threshold, the apparatus adds the adjustment value to the threshold to generate the adjusted threshold.

In a forty-fourth aspect, alone or in combination with one or more of the first through forty-third aspects, the apparatus determines a BSR corresponding to a primary entity, a PHR corresponding to the primary entity, or both.

In a forty-fifth aspect, in combination with the forty-fourth aspect, the apparatus, based on the selection of the one of the multiple RLC layers corresponding to the primary entity, increases a BSR value of the BSR to generate a modified BSR.

In a forty-sixth aspect, in combination with the forty-fifth aspect, the apparatus transmits, to a primary network device, the modified BSR, the PHR, or both.

In a forty-seventh aspect, alone or in combination with one or more of the first through forty-sixth aspects, the apparatus determines a BSR corresponding to a secondary entity, a PHR corresponding to the secondary entity, or both.

In a forty-eighth aspect, in combination with the forty-seventh aspect, the apparatus, based on the selection of the one of the multiple RLC layers corresponding to the primary entity, decreases a BSR value of the BSR corresponding to the secondary entity to generate a modified BSR corresponding to the secondary entity, decreases a PHR value of the PHR corresponding to the secondary entity to generate a modified PHR corresponding to the secondary entity, or both.

In a forty-ninth aspect, in combination with the forty-eighth aspect, the apparatus transmits, to a secondary network device, the modified BSR corresponding to the secondary entity, the modified PHR corresponding to the secondary entity, or both.

In a fiftieth aspect, alone or in combination with one or more of the first through forty-ninth aspects, the apparatus, based on a selection of the one of the multiple RLC layers corresponding to a secondary entity, determines the adjustment value.

In a fifty-first aspect, in combination with the fiftieth aspects, to adjust the threshold, the apparatus subtracts the adjustment value from the threshold to generate the adjusted threshold.

In a fifty-second aspect, alone or in combination with one or more of the first through forty-first aspects or the fifty-first aspect, the apparatus determines a BSR corresponding to the secondary entity, a PHR corresponding to the secondary entity, or both.

In a fifty-third aspect, in combination with the fifty-second aspect, the apparatus, based on the selection of the one of the multiple RLC layers corresponding to the secondary entity, increases a BSR value of the BSR to generate a modified BSR.

In a fifty-fourth aspect, in combination with the fifty-third aspect, the apparatus transmits, to a secondary network device, the modified BSR, the PHR, or both.

In a fifty-fifth aspect, alone or in combination with one or more of the first through forty-first aspects or the fifty-first through fifty-fourth aspects, the apparatus determines a BSR corresponding to a primary entity, a PHR corresponding to the primary entity, or both.

In a fifty-sixth aspect, in combination with the fifty-fifth aspect, the apparatus, based on the selection of the one of the multiple RLC layers corresponding to the secondary entity, decreases a BSR value of the BSR corresponding to the primary entity to generate a modified BSR corresponding to the primary entity, decreases a PHR value of the PHR corresponding to the primary entity to generate a modified PHR corresponding to the primary entity, or both.

In a fifty-seventh aspect, in combination with the fifty-sixth aspect, the apparatus transmits, to a primary network device, the modified BSR corresponding to the primary entity, the modified PHR corresponding to the primary entity, or both.

In a fifty-eighth aspect, alone or in combination with one or more of the first through forty-first aspects, the apparatus, after transmission of the data, determines, while in the dual connectivity configuration, an amount of data pending for transmission.

In a fifty-ninth aspect, in combination with the fifty-eighth aspect, the apparatus performs a comparison between the amount of data pending for transmission and the threshold.

In a sixtieth aspect, in combination with the fifty-ninth aspect, the apparatus routes additional data to one of the multiple RLC layers based on the comparison.

In a sixty-first aspect, in combination with the sixtieth aspect, the apparatus transmits the additional data.

In a sixty-second aspect, in combination with one or more of the fifty-eighth through sixty-first aspects, the amount of data pending for transmission includes an amount of PDCP data.

In a sixty-third aspect, in combination with one or more of fifty-eighth first through sixty-second aspects, if the amount of data pending for transmission is greater than or equal to the threshold, the additional data is routed to a primary RLC layer of the multiple RLC layers or a secondary RLC layer of the multiple RLC layers.

In a sixty-fourth aspect, in combination with one or more of fifty-eighth first through sixty-second aspects, if the amount of data pending for transmission is less than the threshold, the additional data is routed to a primary RLC layer of the multiple primary RLC layers.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein (e.g., components of FIG. 3, functional blocks of FIGS. 6-8, and modules in FIG. 2) may include processors, electronics devices, hardware devices, electronics components, logical circuits, memories, software codes, firmware codes, etc., or any combination thereof. In addition, features discussed herein relating to components, the functional blocks, and the modules described herein (e.g., components of FIG. 3, functional blocks of FIGS. 6-8, and modules in FIG. 2) may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 6-8) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication, the method comprising:
   determining, by a user equipment (UE):
      a first value including a first number of bits sent by a primary radio link control (RLC) layer of the UE during a first time period, a first power efficiency value corresponding to the primary RLC layer, or a combination thereof; or
      a second value including a second number of bits sent by a secondary RLC layer of the UE during a second time period, a second power efficiency value corresponding to the secondary RLC layer, or a combination thereof;
   adjusting, by the UE while in a dual connectivity configuration and based on the determined first value or the determined second value, a threshold;
   routing, by the UE, data to the one of multiple RLC layers based on the adjusted threshold; and
   transmitting, by the UE, the data.

2. The method of claim 1, wherein:
   the dual connectivity configuration corresponds to an evolved universal terrestrial radio access (E-UTRA) new radio (NR) dual connectivity (ENDO) configuration;
   the threshold comprises a ul-DataSplitThreshold;
   the data comprises a packet data unit (PDU); or
   a combination thereof.

3. The method of claim 1, further comprising determining, by the UE, a first data rate corresponding to the primary RLC layer, a second data rate corresponding to the secondary RLC layer, or both, wherein:
   the multiple RLC layers comprise a first RLC layer and a second RLC layer;
   the first RLC layer and the second RLC layer belong to different cell groups; and
   the first time period and the second time period are different time periods.

4. The method of claim 3, wherein:
a first set of layers corresponds to a primary entity, the first set of layers comprising the first RLC layer; and
a second set of layers corresponds to a secondary entity, the second set of layers comprising the second RLC layer.

5. The method of claim 4, wherein:
the data is routed from a packet data convergence protocol (PDCP) layer to the one of the multiple RLC layers; and
the PDCP corresponds to the primary entity.

6. The method of claim 1, further comprising:
determining, by the UE, the first power efficiency value corresponding to the primary RLC layer and the second power efficiency value corresponding to the second RLC layer, wherein the adjusting is based on a RLC layer selected from among one of multiple RLC layers by a comparison of the first power efficiency value and the second power efficiency value.

7. The method of claim 6, further comprising:
providing, by the UE, the data from an application layer to a PDCP layer; and
receiving, by the UE, a selection of one of multiple uplink transmission modes, wherein:
the selection is received via a user interface of the UE or determined by the UE;
the multiple uplink transmission modes include a power mode and a turbo mode; or
a combination thereof.

8. The method of claim 1, further comprising:
determining, by the UE, a first power value associated with the primary RLC layer corresponding to the first time period; and
determining, by the UE, a second power value associated with the secondary RLC layer corresponding to the second time period.

9. The method of claim 8, wherein:
the first power value corresponds to a transmit power of a primary medium access control (MAC) layer; and
the second power value corresponds to a transmit power of a secondary MAC layer.

10. An apparatus configured for wireless communication, the apparatus comprising:
at least one processor; and
a memory coupled to the at least one processor,
wherein the at least one processor is configured to:
determine, by a user equipment (UE):
a first value including a first number of bits sent by a primary radio link control (RLC) layer of the UE during a first time period, a first power efficiency value corresponding to the primary RLC layer, or a combination thereof; or
a second value including a second number of bits sent by a secondary RLC layer of the UE during a second time period, a second power efficiency value corresponding to the secondary RLC layer, or a combination thereof;
adjust, by the UE while in a dual connectivity configuration and based on the determined first value or the determined second value, a threshold;
route data to one of multiple RLC layers based on the adjusted threshold; and
initiate transmission of the data.

11. The apparatus of claim 10, wherein the at least one processor is further configured to:
calculate the first power efficiency value; and
calculate the second power efficiency value.

12. The apparatus of claim 11, wherein:
the first power efficiency value is calculated based on the first number of bits and a first power value; and
the second power efficiency value is calculated based on the second number of bits and a second power value.

13. The apparatus of claim 11, wherein the at least one processor is further configured to:
perform a comparison based on the first power efficiency value and the second power efficiency value; and
select the one of the multiple RLC layers based on a result of the comparison; and
wherein the threshold is adjusted based on the one of the multiple RLC layers.

14. The apparatus of claim 10, wherein the at least one processor is further configured to:
determine the first power efficiency value corresponding to the primary RLC layer and the second power efficiency value corresponding to the secondary RLC layer; and
route the data to the one of the multiple RLC layers based on a comparison between the first power efficiency value and the second power efficiency value.

15. The apparatus of claim 10, wherein the at least one processor is further configured to:
calculate a first data rate corresponding to the first time period, the first data rate calculated based on the first number of bits; and
calculate a second data rate corresponding to the second time period, the second data rate calculated based on the second number of bits.

16. The apparatus of claim 15, wherein the at least one processor is further configured to:
perform a comparison based on the first data rate and the second data rate; and
select the one of the multiple RLC layers based on a result of the comparison; and
wherein the threshold is adjusted based further on the one of the multiple RLC layers.

17. The apparatus of claim 10, wherein the at least one processor is further configured to:
determine a first data rate corresponding to the primary RLC layer and a second data rate corresponding to the secondary RLC layer; and
route the data to the one of the multiple RLC layers based on a comparison between the first data rate and the second data rate.

18. A non-transitory computer-readable medium having program code recorded thereon, the program code comprising:
program code executable by a computer for causing the computer to adjust, by a user equipment (UE) while in a dual connectivity configuration, a threshold;
program code executable by the computer for causing the computer to route data to one of multiple radio link control (RLC) layers based on the threshold;
program code executable by the computer for causing the computer to, based on the one of the multiple RLC layers corresponding to a primary entity:
increase a buffer status report (BSR) value of a BSR corresponding to the primary, entity to generate a modified BSR corresponding to the primary entity;
decrease a BSR value of a BSR corresponding to a secondary entity to generate a modified BSR corresponding to the secondary entity;

decrease a power headroom report (PHR) value of a PHR corresponding to the secondary entity to generate a modified PHR corresponding to the secondary entity; or a combination thereof;

program code executable by the computer for causing the computer to transmit, by the UE, the data; and program code executable by the computer for causing the computer to transmit, by the UE and after transmission of the data, additional data pending for transmission, the additional data routed to the one of the multiple RLC layers based on a comparison between the amount of the additional data and the adjusted threshold.

19. The non-transitory computer-readable medium of claim 18, wherein the program code further comprises:

program code executable by the computer for causing the computer to determine an adjustment value based on a selection of the one of the multiple RLC layers corresponding to a primary entity; and wherein adjustment of the threshold includes addition of the adjustment value to the threshold to generate an adjusted threshold.

20. The non-transitory computer-readable medium of claim 18, wherein the program code further comprises:

program code executable by the computer for causing the computer to determine the BSR corresponding to the primary entity, a PHR corresponding to the primary entity, or both; and program code executable by the computer for causing the computer to initiate transmission of, to a primary network device, the modified BSR corresponding to the primary entity, the PHR corresponding to the primary entity, or both.

21. The non-transitory computer-readable medium of claim 18, wherein the program code further comprises:

program code executable by the computer for causing the computer to determine a BSR corresponding to the secondary entity, a PHR corresponding to the secondary entity, or both; and program code executable by the computer for causing the computer to initiate transmission of, to a secondary network device, the modified BSR corresponding to the secondary entity, the modified PHR corresponding to the secondary entity, or both.

22. An apparatus configured for wireless communication, the apparatus comprising:

means for adjusting, by a user equipment (UE) while in a dual connectivity configuration, a threshold;

means for routing, by the UE, data to one of multiple radio link control (RLC) layers based on the adjusted threshold;

means for, based on the one of the multiple RLC layers corresponding to a secondary entity:

increasing a buffer status report (BSR) value of a BSR corresponding to the secondary entity to generate a modified BSR corresponding to the secondary entity;

decreasing a BSR value of a BSR corresponding to a primary entity to generate a modified BSR corresponding to the primary entity;

decreasing a power headroom report (PHR) value of a PHR corresponding to the primary entity to generate a modified PHR corresponding to the primary entity; or a combination thereof;

means for transmitting, by the UE, the data; and means for transmitting, the UE and after transmission of the data, additional data pending for transmission, the additional data routed to the one of the multiple RLC layers based on a comparison between the amount of the additional data and the adjusted threshold.

23. The apparatus of claim 22, further comprising:

means for determining an adjustment value based on a selection of the one of the multiple RLC layers corresponding to the secondary entity; and wherein adjustment of the threshold includes subtraction of the adjustment value from the threshold to generate an adjusted threshold.

24. The apparatus of claim 22, further comprising:

means for determining the BSR corresponding to the secondary entity, a PHR corresponding to the secondary entity, or both; and means for transmitting, to a secondary network device, the modified BSR corresponding to the secondary entity, the PHR corresponding to the secondary entity, or both.

25. The apparatus of claim 24, further comprising:

means for determining the BSR corresponding to the primary entity, the PHR corresponding to the primary entity, or both; and means for transmitting, to a primary network device, the modified BSR corresponding to the primary entity, the modified PHR corresponding to the primary entity, or both.

26. The apparatus of claim 22, further comprising:

means for determining, while in the dual connectivity configuration; an amount of data pending for transmission after transmission of the data;

means for performing a comparison between the amount of data pending for transmission and the threshold;

means for routing additional data to the one of the multiple RLC layers based on the comparison; and means for transmitting the additional data.

27. The apparatus of claim 26, wherein:

the amount of data pending for transmission includes an amount of packet data convergence protocol (PDCP) data; and if the amount of data pending for transmission is greater than or equal to the threshold, the additional data is routed to a primary RLC layer of the multiple RLC layers or a secondary RLC layer of the multiple RLC layers; or if the amount of data pending for transmission is less than the threshold, the additional data is routed to a primary RLC layer of the multiple primary RLC layers.

28. The method of claim 1, further comprising:

determining, by the UE:

a first power efficiency value corresponding to the primary RLC layer and not the first number of bits sent by the primary RLC layer of the UE during the first time period; or a second power efficiency value corresponding to the secondary RLC layer and not the second number of bits sent by the secondary RLC layer of the LE during the second time period.

29. The apparatus of claim 10, wherein the at least one processor configured to adjust, by the UE while in the dual connectivity configuration, the threshold further comprises the at least one processor configured to adjust the threshold based on a selection of one of multiple uplink transmissions modes.

30. The non-transitory computer-readable medium of claim 18, wherein the program code further comprises:

program code executable by the computer for causing the computer to determine, while in the dual connectivity configuration, an amount of the additional data pending for transmission after the transmission of the data.

* * * * *